Figure 1:
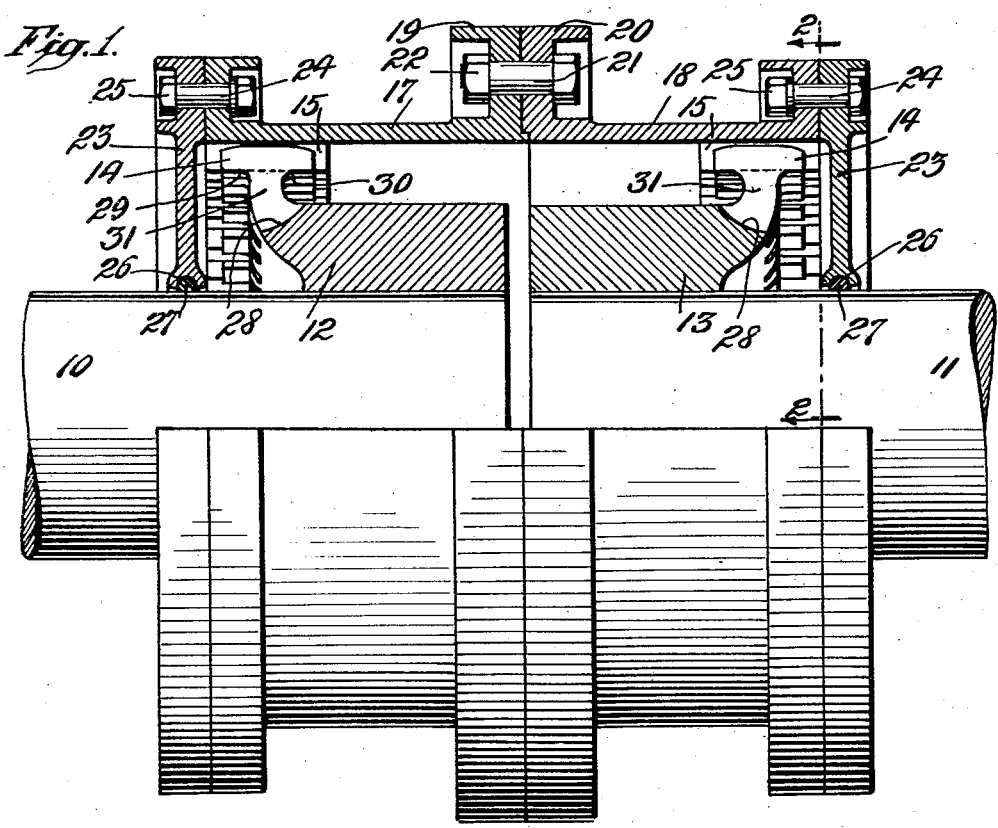

Jan. 9, 1934.   R. A. SMITH   1,942,782
FLEXIBLE COUPLING
Filed Aug. 6, 1930

INVENTOR
ROBERT A. SMITH
BY Archibald Coy
ATTORNEY

Patented Jan. 9, 1934

1,942,782

UNITED STATES PATENT OFFICE 1,942,782

FLEXIBLE COUPLING

Robert A. Smith, Mahwah, N. J., assignor to Smith & Serrell, Elizabeth, N. J., a copartnership consisting of Robert A. Smith and John J. Serrell Application August 6, 1930. Serial No. 473,338

7 Claims. (Cl. 64—96)

This invention relates to flexible couplings and more particularly to flexible couplings of the type in which two shafts are provided adjacent the ends to be coupled with gears adapted to cooperate with internal gears in a casing or sleeve which encloses the gears fixed on the shafts.

Heretofore, in couplings of the type referred to, the coupling has generally consisted of two hubs or flanges each keyed to its respective shaft and each hub has been provided with a spur gear positioned thereon at the greatest practicable distance from the shaft end. These hubs or flanges have been enclosed in a casing or sleeve having internal gears at opposite ends to cooperate with the external gears on the flanges. The casing or sleeve also serves as a grease or lubricant casing and preferably contains oil which is intended to create, under the action of centrifugal force, a film of oil between the gear teeth so as to cushion the action therebetween. Under actual working conditions it is found that there is frequently considerable wear and grinding between the cooperating external and internal gears.

The main object of the invention is to provide an improved flexible coupling of the general type specified which will avoid such disadvantages.

Figure 2:
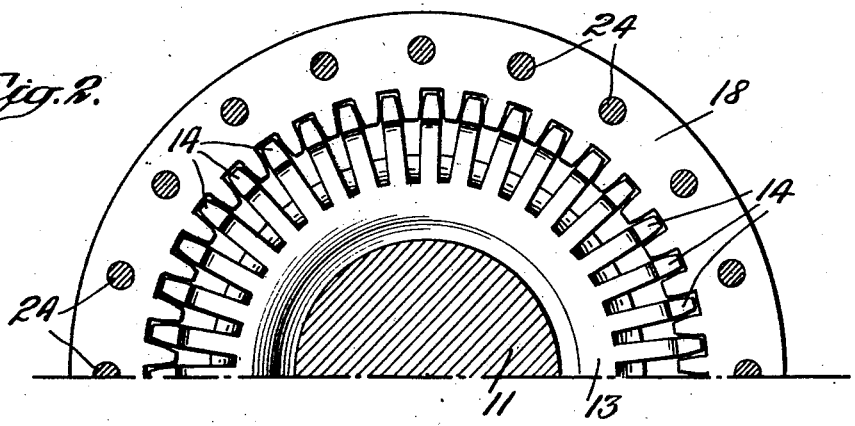

Other objects and features of the invention will appear upon consideration of the following detailed description and the showing of a preferred form of the invention in the drawing in which:

Fig. 1 is a side view of the coupling, partly broken away, to show the underlying structure; and Fig. 2 is a section along the line 2—2 of Fig. 1.

The objects of the invention are in general attained in various ways as by rendering cooperating parts more flexible. For example, the teeth at the outer ends of the coupling members fixed on the shafts may be made flexible, as by flexibly mounting them on the coupling members, and the teeth may be so shaped as to accommodate to a greater advantage angular changes of alignment between the shafts and between the shafts and the casing or sleeve.

Referring to the drawing, 10 and 11 are shafts of which the ends are to be coupled, and these shafts are provided respectively with coupling members or hubs 12 and 13 fixed to the corresponding shafts in any suitable manner, and provided at their outer ends with teeth 14 forming external gears to mesh with teeth 15 forming internal gears at the outer ends of casing members 17 and 18. At their inner ends, these casing members are provided, respectively, with suitable flanges 19 and 20 which may be secured together by bolts 21 and nuts 22 threaded thereon. The sleeve or lubricant casing including the sections 17 and 18 should be closed at its ends, and as here disclosed this is done by means of similar annular members 23 fitting closely around the shafts 10, 11 and secured to the casing sections 17 and 18 by suitable means such as bolts 24 and nuts 25. To obtain liquid tight joints around the shafts 10, 11 the inner edges of the members 23 may be provided with grooves 26 containing cushioning material such as rings 27 of rubber.

To avoid the grinding and wear due to the rigidity of the cooperating tooth parts, certain of the teeth, here shown as the teeth on the hubs 12 and 13, are so constructed as to have the necessary amount of flexibility, that is to say, the teeth are flexibly mounted on the hubs 12 and 13. The flexibility of the teeth 14 is obtained by cutting the notches between the teeth 14 much deeper than was the practice heretofore, as indicated at 28, so that the teeth proper are in effect supported independently on flexible members. This effect is further attained by cutting away the material of the supporting portions of the teeth at 29 and 30 beneath the teeth proper or heads to form relatively narrow necks or shanks 31. In order to obtain the proper engagement with the teeth 14 and 15, it is desirable to make the heads or the teeth proper 14 of considerable width, but this tends to interfere with changes in alignment between the axes of the various coupling members. This difficulty is, however, met by forming the heads of the teeth 14 with their edges inclined downwardly towards the opposite ends of the teeth. The teeth 14 are also arranged so that they are positioned outwardly beyond the outer ends of the coupling members 12 and 13 and are therefore at a considerable distance from the middle of the coupling.

It will be seen that by arranging the teeth according to the present invention the connection between the hubs 12 and 13 and the teeth 15 at the corresponding ends of the lubricant casing or sleeve will be sufficiently yielding as to avoid grinding and wear which would occur between members having rigid teeth, and that by virtue of the curved edges of the teeth 14 there will be no substantial additional stress put upon the parts due to small changes in direction of the axes of the various parts.

It should be understood that various changes may be made in the construction and arrangement of parts and that certain parts may be used without others without departing from the sure spirit and scope of the invention.

I claim:

1. In a flexible coupling, the combination of an internal gear and an external gear cooperating therewith and having flexibly mounted teeth capable of rotative movement on their radial axes to absorb shocks and permit adjustment between the gears, the ends of the teeth being formed with higher central portions to enable adjustment for relative changes in direction of the axes of rotation.

2. In a flexible coupling, the combination of an internal gear and an external gear having flexibly mounted teeth with their ends arranged in a circle in the usual manner but with their bodies extending laterally with respect to the plane of rotation to provide increased effective length and flexibility.

3. In a flexible coupling, the combination of an internal gear and an external gear having flexibly mounted teeth with shanks of smaller cross section than the ends and the ends lower at the sides of the teeth than at the center.

4. In a flexible coupling for two shafts, the combination of two coupling members fixed on the ends of said shafts and formed at their outer ends with external gears comprising flexibly mounted teeth overhanging the ends so that the teeth may be capable of rotative movement on their radial axes and to position the gears away from the ends of the shafts, and a casing enclosing said external gears and provided at its inside with internal gears to cooperate with the external gears.

5. In a flexible coupling, a torque transmitting device comprising cooperating gear members having teeth arranged substantially parallel with the axis of the coupling, and one of said gear members having its teeth undercut transversely of the axis of the coupling so that the individual teeth thereof are capable of rotative movement on their radial axis.

6. In a flexible coupling, a torque transmitting device comprising an internal gear and an external gear having their teeth arranged substantially parallel with the axis of the coupling, the teeth of the external gear being undercut transversely of the axis of the coupling so that each tooth is capable of rotative movement on its radial axis.

7. In a flexible coupling, a torque transmitting device comprising an internal gear and an external gear, having intermeshing teeth arranged substantially parallel with the axis of the coupling, the teeth of the external gear being provided with shanks of smaller cross section than the ends of the teeth, so that said ends are capable of rotative movement on their radial axis.

ROBERT A. SMITH.